INVENTOR
JOSEPH ADAMSKI

BY Stowell & Stowell
ATTORNEYS

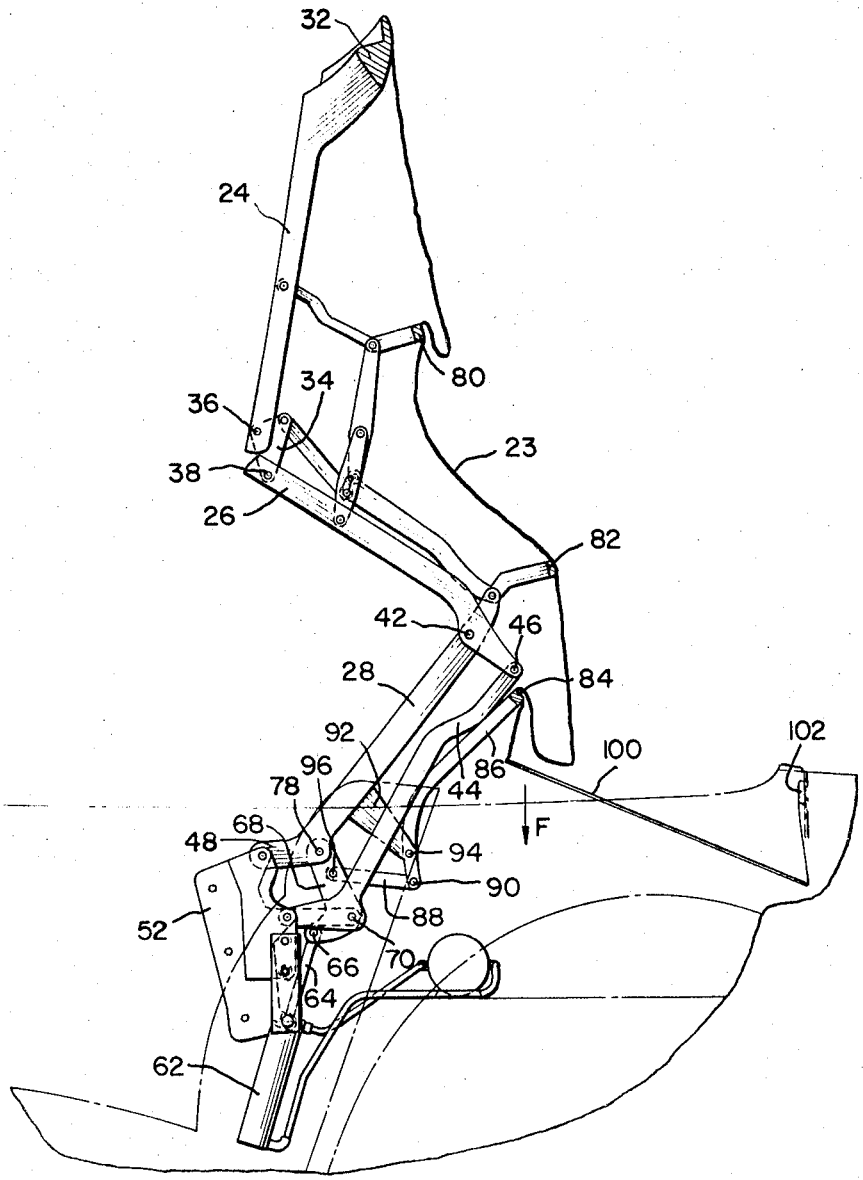

July 1, 1969  J. ADAMSKI  3,453,021
BOW CONTROL MEANS FOR CONVERTIBLE TOP
Filed Nov. 2, 1966  Sheet 3 of 5
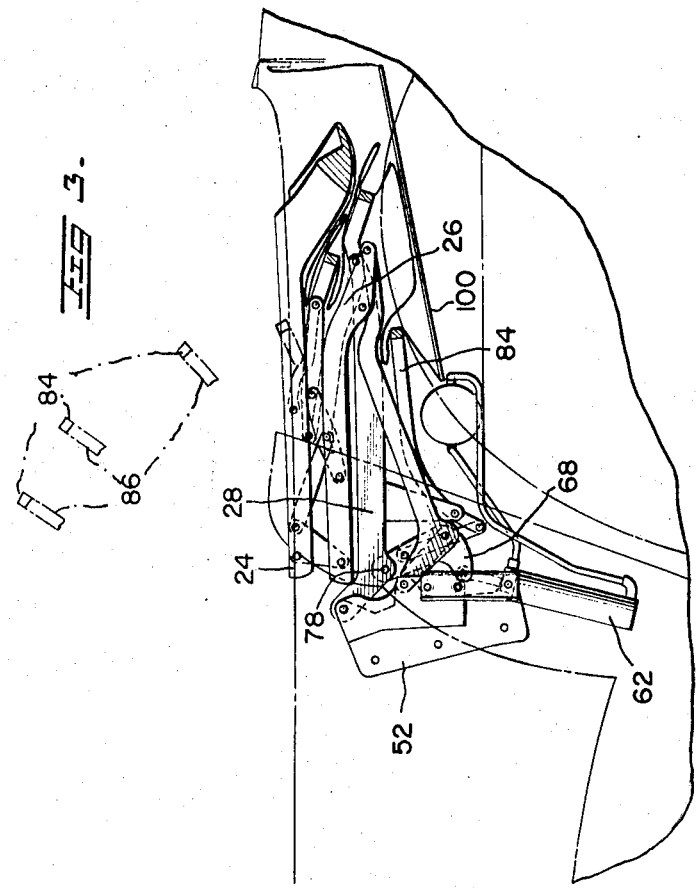
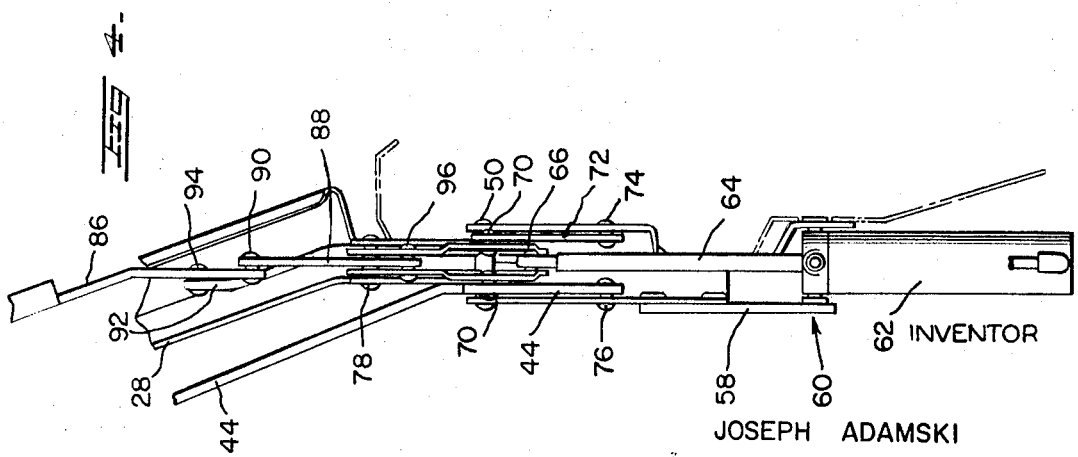
INVENTOR
JOSEPH ADAMSKI
BY Stowell & Stowell
ATTORNEYS

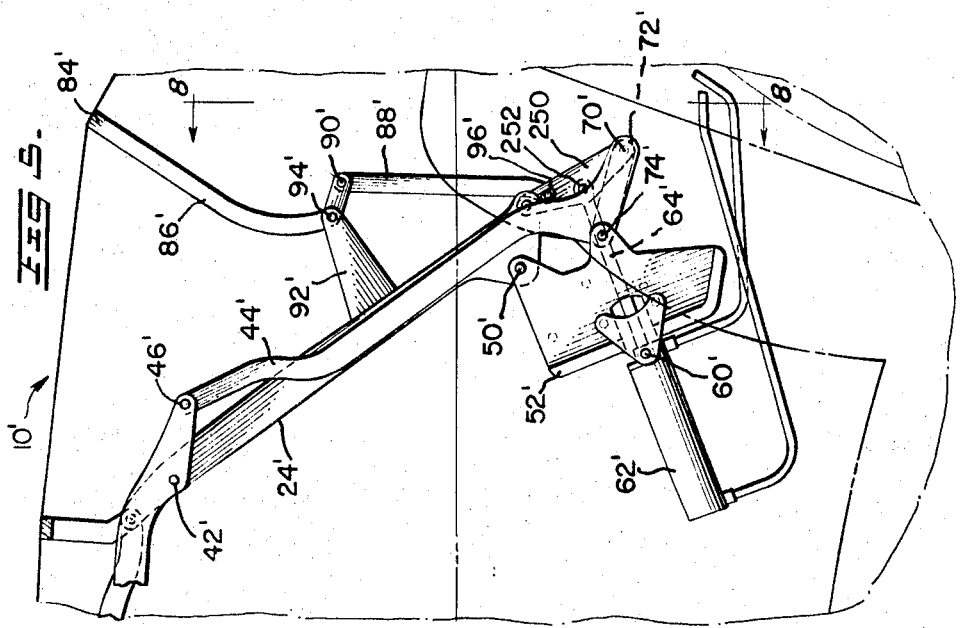
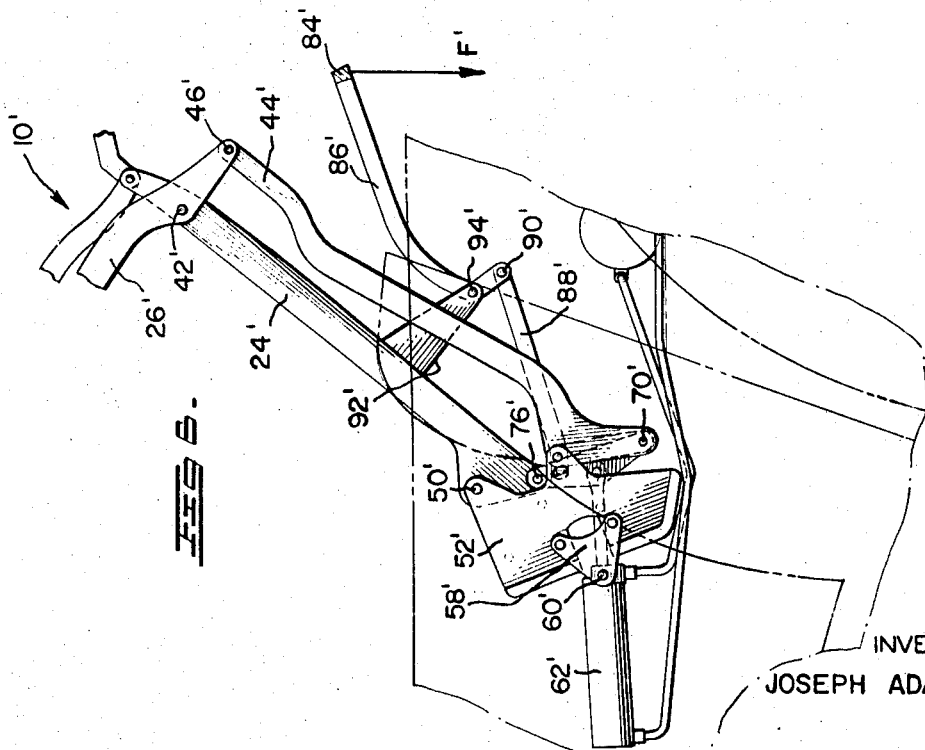

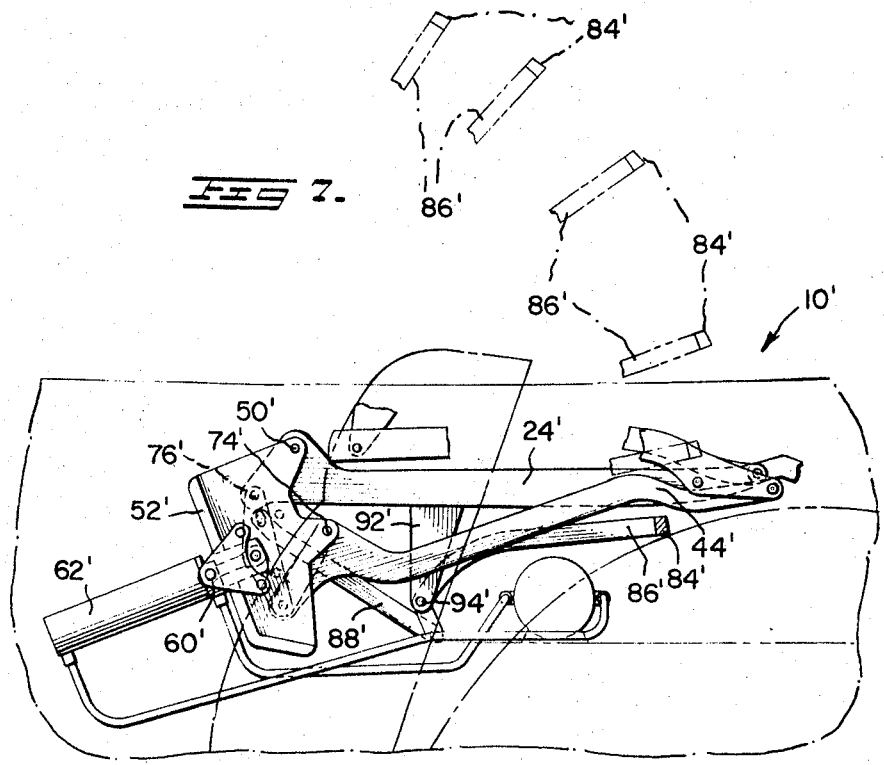
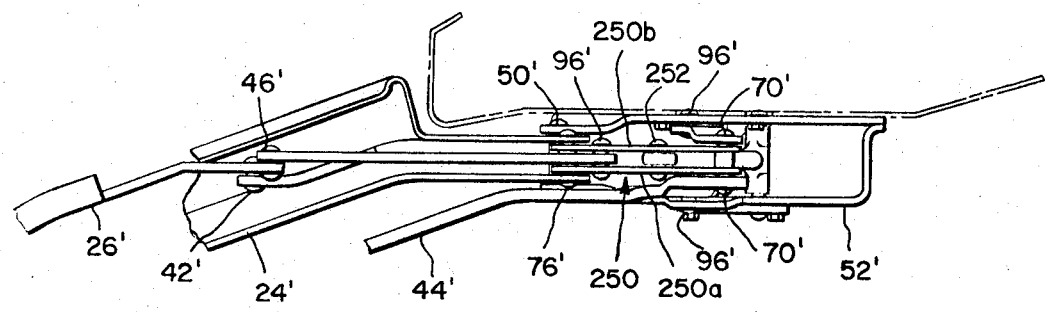

United States Patent Office 3,453,021
Patented July 1, 1969

3,453,021
BOW CONTROL MEANS FOR CONVERTIBLE TOP
Joseph Adamski, Brooklyn, Mich., assignor to Dura Corporation, Oak Park, Mich., a corporation of Michigan
Filed Nov. 2, 1966, Ser. No. 591,598
Int. Cl. B60j 7/12
U.S. Cl. 296—117                    4 Claims

ABSTRACT OF THE DISCLOSURE

The rear bow of a convertible vehicle top actuating mechanism is positively actuated and continually controlled during lowering and raising of the top by having its end portions on each side of the vehicle pivotally connected to a control lever which derives its motion and force solely from a pivotal connection to a power transfer unit, that is pivoted to and actuated by a linear actuator, and to which the rear rail of the top actuating mechanism is pivotally attached at one point and the control link for the center rail of such mechanism is pivotally attached at a spaced point.

---

This invention relates to an improved top mechanism for vehicles.

It is the current practice in the automotive industry to employ heavy hard glass rear windows in convertible tops instead of the flexible relatively light weight plastic windows generally employed in the past. The additional weight and the necessity for storing the hard glass, without folding, when the top is folded add to the necessary increased degree of travel of folding top mechanism and to the power requirements of the top actuators. This use of hard glass windows in conjunction with the current practice in vehicle body design of lowering the window or belt line of such vehicles has rendered many of the prior art folding top mechanisms inadequate to perform their intended function.

It is therefore an object of the present invention to provide a folding top mechanism which moves through an arc substantially greater than 90° and in which the swinging motion of the pivotally mounted linear actuator for the top is minimized during the folding and unfolding of the top mechanism and wherein the rear bow of the convertible top, which generally carries a large portion of the weight of the rear hard glass window, is mechanically interconnected in one form of the invention, to the power transfer member to thereby eliminate adverse counter forces during actuation of the top mechanism.

A further object is to provide improved control of the folding process of a convertible top to thereby permit proper storage of a hard glass rear window in a folding top vehicle structure.

Another object of the present invention is to provide means for simultaneously directing power to the rear rail, the control link, and to the rear bow of a convertible top.

Another object is to provide a power actuated convertible top mechanism wherein the distribution of force moments, in either extreme of the actuated travel is substantially uniform to thereby assist in accommodating long and heavy tops including hard glass rear windows therefor.

Further objects of the invention are to provide a folding top structure for a convertible motor vehicle which is relatively simple in construction, light in weight, easy to assemble and may be installed as a preadjusted assembly in a vehicle body.

These and other objects and advantages are provided by a folding top mechanism for motor vehicles including a plurality of articulately interconnected members including for each side of the vehicle a rear rail and a control link, each pivotally connected to the vehicle body, an actuator, means mounting one element of the actuator to the vehicle body, a power transfer member, means pivotally connecting another element of the actuator to the power transfer member, means pivotally connecting the rear rail and the control link to the power transfer member on spaced axes for actuation of the rear rail and the control link between a top folded position and a top extended position, a rear top support bow of generally U-shape, a bow support bracket rigidly carried by each of the rear rails, a rear bow actuating lever for each side of the vehicle, means pivotally connecting one end of the bow actuating lever to its corresponding power transfer member, means pivotally connecting the other end of the bow actuating lever to the end of its corresponding leg of the U-shaped rear bow, and means pivotally connecting each leg of said rear bow to its corresponding rear rail support bracket whereby during folding and unfolding of the top structure the rear bow is positively actuated into its folded position or unfolded position.

The invention will be more fully described and other objects and advantages will be apparent from the following detailed description of the invention when considered in light of the drawings, wherein;

FIGURE 2 is an enlarged fragmentary view of the structure shown in FIGURE 1 with the top in an intermediate position between its extended and its folded positions which view illustrates the hard glass rear window being removed or placed in its storage position;

FIGURE 3 is a view similar to that illustrated in FIGURE 2 with the folding top mechanism in the fully retracted position and with the position of the rear bow illustrated in phantom lines in various positions of erection of the convertible top;

FIGURE 4 is an enlarged fragmentary view of line 4—4 of FIGURE 1;

FIGURE 5 is a fragmentary vertical section through one side of a portion of the operating linkage of a modified form of convertible top with the top shown in its extended or open position and with certain portions of the vehicle body omitted and other portions shown in phantom;

FIGURE 6 is a fragmentary view of the structure shown in FIGURE 5 in an intermediate position of the operative positions of the top structure;

FIGURE 7 is a view similar to that shown in FIGURES 5 and 6 with the top illustrated in a rearward folded position; and FIGURE 8 is a section along line 8—8 of FIGURE 5.

Figure 1:
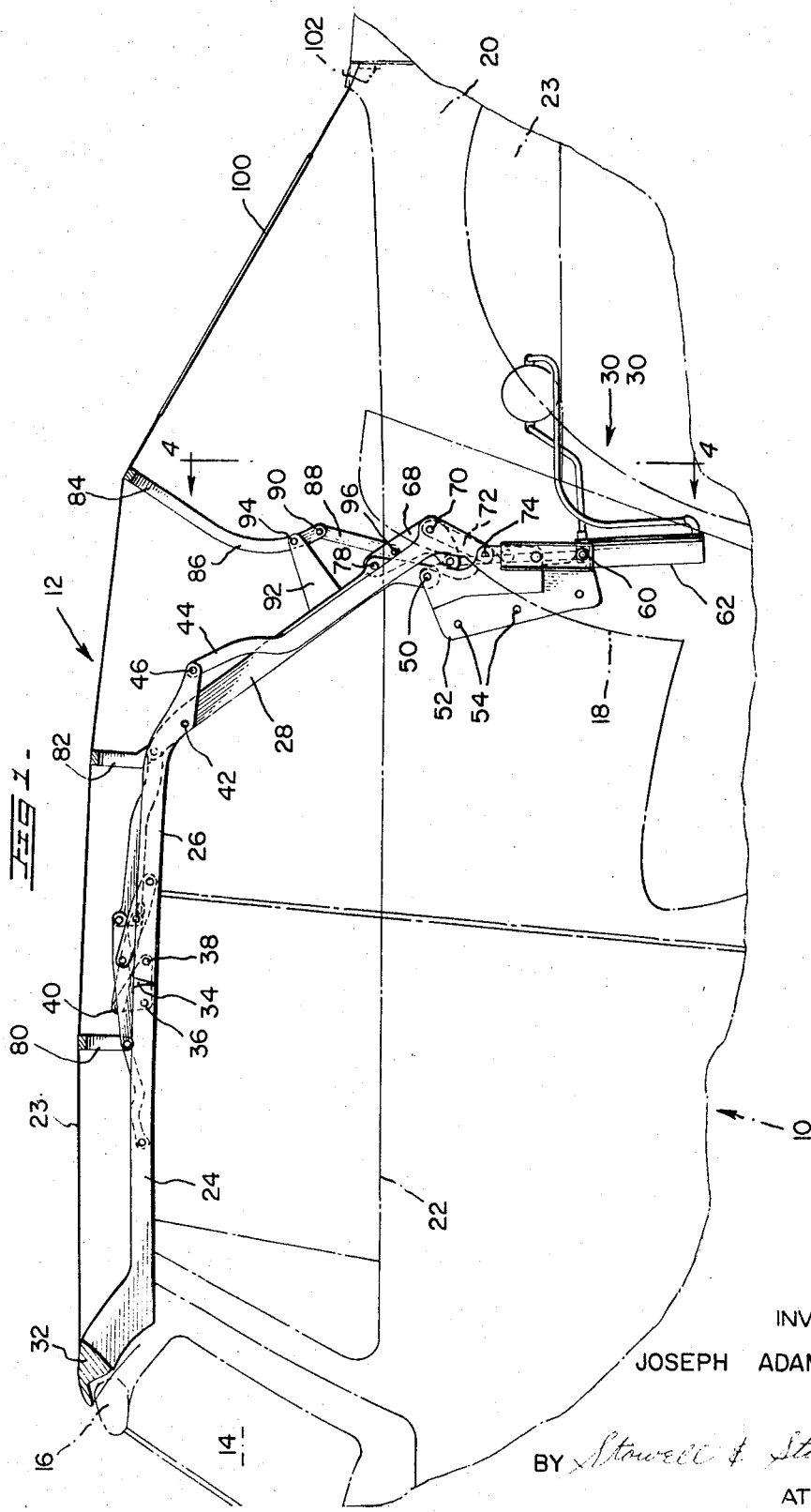
FIGURE 1 is a vertical section through one side of the operating linkage of a convertible top shown in the extended position with certain portions of the vehicle body omitted and other portions shown in phantom.

Referring to the drawing and FIGURES 1 through 4 in particular a vehicle body 10 is shown in phantom lines and is provided with a folding top 12 which is shown as erected and extended thereover.

The vehicle body 10 is shown sufficiently to identify the windshield 14 having a header bar 16 and a rear seat 18 behind which is provided the trunk area and space 20 receptive of the folding top 12 in its fully retracted and stored position. The vehicle belt line 22 and rear wheel housing 23 are also shown and identified for general reference purpose.

In the subsequent discussion of the folding top 12 and the operative mechanism thereof, reference made to the "forward" or "rearward" disposition of any member, or the use of like terms, is to be understood as with regard to the position thereof with respect to the front or back ends of the vehicle 10 on which the top is provided.

The top structure 12 includes articulated side frame rails and interconnected cross-bows which form a frame-work over which a fabric cover 23 is extended. The side frame rails are each made up of a front side frame rail section 24, a center side frame rail section 26 and a rear side frame rail section 28. The articulated side frame rails are symmetrically opposite and are power operated by actuating means 30.

As will be appreciated, the actuating means 30 are interconnected for synchronous operation and are mounted on the vehicle body.

The front side rail sections 24 have a top header 32 provided across their forward ends and formed for engagement with the windshield header bar 16. A pivot plate member 34 is connected to the rear end of the front side rail section 24 and to the forward end of the center rail section 26. The pivot plate is triangular in shape with spaced pivot connections 36 and 38 for engagement with the front and center side rail sections 24 and 26, respectively, and with a third pivotal connection 40 disposed apart therefrom for connection to an operating link in a manner described in my Patent 3,180,675, dated Apr. 27, 1965.

The center side rail section 26 is connected to the pivot plate 34, as mentioned, and includes a pivotal connection 42 near its rear end providing engagement with the rear side rail section 28. A control link 44 is engaged to the rearmost end of the center side rail section 26 by means of the pivotal connection 46.

The rear side rail section 28 is pivotally connected to the center rail section 26 at 42, as mentioned, and is formed to provide a generally downwardly disposed end 48 which is pivotally connected at 50 to a support bracket 52.

The support structure 52 is generally U-shape in transverse cross section and fasteners 54 attach the support structure 52 to the inner surface of a weldment of the vehicle body structure. The U-shaped bracket 52 includes plate 58, FIGURE 4, which is attached to the bracket 52 by fasteners and this extension forms a yoke and trunnion pivot support 60 for the hydraulic cylinder 62 which serves as the linear power actuator.

The piston rod 64 of the cylinder 62 is pivotally connected to a power plate 68 via pivot pin 66. The power plate 68 is also pivotally connected at 70 to the control link 44. In order to provide stability for the pivotal connection 70, a stabilizer link 72 is also connected to the pivotal connection 70 at one end while the other end is connected to the bracket 52 at pivot 74. The latter pivot is aligned with pivot 76 which connects the lower end of control link 44 to the bracket 52 as more clearly shown in FIGURE 4 of the drawings.

Another portion of the power plate 68 is pivotally connected at 78 to the rear rail 28 whereby power applied to the power plate 68 by the piston rod 64 is directed simultaneously to both the rear rail and the control link.

The assembly also includes a plurality of fabric cupporting bows generally designated 80, 82, and 84. Bow 84 is the rear bow and is generally U-shaped in elevation and the legs thereof are designated with reference character 86. The lower most end of each leg 86 of the rear bow 84 is pivotally connected to a bow actuator link 88; one being provided for each of the legs 86. actuator link 88; one being provided for each of the legs 86. Pin 90, as more clearly shown in FIGURE 1, connects each of the rear bow legs 86 to its respective bow actuator link 88. Further the rear bow 84 is pivotally connected to a bow bracket 92, one being provided on each side of the convertible top mechanism. The bow brackets 92 are rigidly secured such as by welding to their respective rear rail 28 and the connections between the legs of the rear bow and the bow support brackets are via pivot pins 94.

The lower most end of each of the bow actuating links 88 is pivotally connected to its respective power plate via pivot pin 96 whereby power is also directed to the rear bow simultaneously with the direction of power to the rear rail 28 and the control link 44 during actuation of the power cylinder 62.

Referring particularly to FIGURE 2 it will be seen that the heavy hard glass rear window 100 is suspended in an opening in the fabric 23, between a point of rearward attachment 102 and the fabric connection to the rear bow 84 and therefore creates a force F in the direction of the directional arrow during erection of the roof. This force E acting through the bow 84 and its legs 86 creates a force tending to urge bow pivot 90 in the direction of pivot 96 which connects the bow actuator link 88 to the power plate 68. Since pivot 96 is above the pivotal connection 66 between the piston rod and the power plate 68 and above the pivot 70 between the control link 44 and the power plate 68 this force tends to rotate the power plate 68 along a radius which is normal to the direction of motion of the power plate during extension of the top from its folded position to its fully extended position.

Thus the weight of the heavy hard glass rear window 100 creates a force which is not antagonistic to the forces tending to erect the top. This advantageous resultant force provides one of the unique advantages of the improved convertible top mechanism of the present invention. Further in lowering or storage of the top from its position, as illustrated in FIGURE 2 of the drawings, the force created by the hard glass window 100 tends to rotate the power plate in a direction opposite to that which it would move in storage of the roof at a point where gravity provides a portion of the required work in storage of the top. Further as will be appreciated from inspection of FIGURES 2 and 3 of the drawings, by positively powering the rear bow 82 the exact position of the bow is positively determined which permits storing of the hard glass window 100, prior to the nesting of the interconnected linkage means into the well adjacent the rear end of the motor vehicle.

The principles of the present invention are also accomplished with modified linkage means wherein the power actuator is connected to a swing link which in turn is connected to the rear rail 24 and the control link 44 as to be more fully described in reference to FIGURES 5 through 8 of the drawings. In FIGURES 5 through 8 similar mechanisms to those illustrated and described with reference to FIGURES 1 through 4 are provided with prime reference characters and dissimilar mechanisms are provided with 250 series reference characters.

In FIGURES 5 through 8 24' comprises the rear rail section which is pivoted at 50' to a vehicle mounted bracket 52'. Also shown in these drawings is the control link 44' which is connected adjacent its upper end via pivot 46' to the center rail section 26'. This center rail section 26' is also pivotally mounted to the rear rail 24' at pivot 42'. The lower end of the control link 44' is pivotally connected to the bracket 52' at pivot 74'. In this form of the invention the power cylinder 62' is also pivotally mounted via pivot or trunnion 60' to a plate 58' secured to the bracket 52'. The piston rod 64' of the cylinder 62' is pivotally connected at pivot 252 to a swing link 250. The swing link 250 comprises a pair of identical members 250a and 250b as more clearly shown in FIGURE 8. The members 250a and 250b are spaced apart whereby the piston rod 64' is nested therebetween to provide strength and resistance to twisting moments in the elements which transmit power from the cylinder 62' to the rear rail section 24' and the control link 44' and as to be more fully described hereinafter to the rear bow 84' having leg portions 86'. The pair of swing links 250a and 250b are pivotally connected at one end to a portion of the control link 44' at pivot 70'.

The other ends of the pair of swing links 250a and 250b are connected to the rear rail section 24' at pivot 76' spaced from the pivotal connection 50' between the rear rail 24' and the bracket 52'.

This form of the assembly also includes a pair of bow brackets 92', one of which is rigidly connected to each of the pair of the rear rail sections 24'. Further the rear support bow 84' is generally U-shape in vertical section and the legs of the U-shape are designated 86'. The legs 86' are pivotally connected to their respective bow supports brackets 92' via pivotal connections 94' while the extended end of each of the bow legs 86' is pivotally connected at pivot point 90' to the extended end of its bow actuator linkage 88'. The lower ends of the bow actuator links 88' are connected to their respective swing links at pivotal connections 96'.

As more clearly shown in FIGURE 8 of the drawing the connection between each of the bow actuator links 88' and the respective swing links is such that the bow actuator link is positioned between the pair of members making up the swing link in a manner similar to that described with reference to the pivotal connection between the swing link and the extended end of the piston rod 64'.

With this form of construction hydraulic fluid directed to the cylinder 62' in a direction to extend the piston rod 64' directs power to the pair of swing links 250a and 250b which in turn simultaneously directs power to the rear rail section 24', the control link 44' and the bow control link 88', for positive simultaneous actuation of these members.

Like the form of the invention illustrated in FIGURES 1 through 4, connecting the rear bow through a control link to the swing link provides positive actuation of the bow to permit controlled storage of the hard glass window prior to nesting of the linkage elements in the forward portion of the trunk area of the convertible vehicle.

From the foregoing discussion of various modifications of the present invention it will be seen that the objects and advantages hereinbefore set forth are fully accomplished and that the invention provides substantial improvements to the convertible top art.

I claim:

1. In a convertible vehicle top actuating mechanism including for each side of the vehicle a rear rail, a center rail and a control link for the center rail, the arrangement therewith comprising each of said rear rail and control link being pivotally connected to the vehicle body, a power actuator at each side of the vehicle and having cooperating elements, means mounting one element of the power actuator to the vehicle body, a power transfer member at each side of the vehicle, means pivotally connecting the other element of the power actuator to its corresponding power transfer member, means pivotally connecting the rear rail to its corresponding power transfer member at one point thereon, means pivotally connecting the control link to its corresponding power transfer member at a point spaced from the pivotal connection of the rear rail to the associated power transfer member, a U-shaped roof supporting rear bow having opposing leg portions terminating in end portions, a bow support bracket rigidly carried by each rear rail on each side of the vehicle, means pivotally connecting the leg portions of the rear bow to the bow support bracket on the rear rails, a rear bow actuating lever at each side of the vehicle, means pivotally connecting one end of each of the bow actuating levers to its corresponding power transfer member and means pivotally connecting the other end of each of the bow actuating levers to the end portion of its corresponding leg portion of the rear bow whereby the rear bow is continually controlled in its movements during lowering and raising of the top by the actuating levers which derive their motion and force solely from their pivotal connections to the power transfer members which actuate the rear rails and the control links simultaneously with such actuation of the rear bow.

2. The invention defined in claim 1 wherein the actuator is a linear actuator comprising a fluid pressure actuated cylinder and piston unit, and said cylinder, said rear rail and said control link are pivotally mounted on a single force constraining bracket at each side of the vehicle.

3. The invention defined in claim 2 wherein the power transfer member comprises a generally L-shaped power plate with one end of the L-shaped power plate being connected to the rear rail, the other end of the L-shaped power plate being connected to the extended end of the piston of the piston and cylinder unit, and wherein the control link is pivotally connected to the L-shaped power plate intermediate the ends thereof and the bow actuating lever is connected to said L-shaped power plate between the pivotal connections of the L-shaped power plate to the rear rail and to the control link.

4. The invention defined in claim 2 wherein the linear actuator comprises a pressure fluid actuated piston and cylinder unit, the power transfer member comprises a generally rectilinear swing link member, and one end of said link member is pivotally connected to the rear rail, the other end of the swing link is connected to the control link, the piston rod is connected to the link intermediate the ends of the swing link and the bow actuating lever is connected to the swing link between the connections between the swing link and the rear rail and the swing link and the piston rod.

References Cited

UNITED STATES PATENTS

| | | | |
|---|---|---|---|
| 3,252,731 | 5/1966 | Brynn et al. | 296—117 |
| 3,180,675 | 4/1965 | Adamski | 296—117 |
| 3,263,515 | 8/1966 | Adamski | 296—117 |
| 3,297,357 | 1/1967 | Adamski | 296—117 |
| 3,342,524 | 9/1967 | Adamski | 296—117 |

KENNETH H. BETTS, *Primary Examiner.*

JOEL E. SIEGEL, *Assistant Examiner.*